United States Patent
Im et al.

(10) Patent No.: US 10,551,671 B2
(45) Date of Patent: Feb. 4, 2020

(54) DISPLAY PANEL WITH LIGHT CONVERTING LAYER THEREIN, DISPLAY DEVICE INCLUDING THE SAME AND METHOD OF MANUFACTURING THE SAME

(71) Applicant: Samsung Display Co., Ltd., Yongin-Si, Gyeonggi-Do (KR)

(72) Inventors: Hyundeok Im, Seoul (KR); Jonghyuk Kang, Suwon-si (KR); Daehyun Kim, Hwaseong-si (KR); Jaebyung Park, Seoul (KR); Hyunmin Cho, Seoul (KR); Sung-jin Hong, Hwaseong-si (KR); Jaewoong Kang, Jeonju-si (KR); Jooyeol Lee, Seoul (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 68 days.

(21) Appl. No.: 15/073,849

(22) Filed: Mar. 18, 2016

(65) Prior Publication Data
US 2017/0023829 A1    Jan. 26, 2017

(30) Foreign Application Priority Data
Jul. 20, 2015  (KR) .................. 10-2015-0102658

(51) Int. Cl.
*G02F 1/1335* (2006.01)
*G02F 1/1333* (2006.01)

(52) U.S. Cl.
CPC .. *G02F 1/133617* (2013.01); *G02F 1/133351* (2013.01); *G02F 1/133512* (2013.01); *G02F 1/133528* (2013.01)

(58) Field of Classification Search
CPC ............ G02F 1/1336; G02F 1/133617; G02F 2001/133614; G02F 1/133351; G02F 1/136209; H01L 29/78633
See application file for complete search history.

(56) References Cited

U.S. PATENT DOCUMENTS

| 8,294,848 B2 | 10/2012 | Cho et al. |
| 2010/0110728 A1 | 5/2010 | Dubrow et al. |
| 2012/0113672 A1 | 5/2012 | Dubrow et al. |

(Continued)

FOREIGN PATENT DOCUMENTS

| KR | 1020110022970 A | 3/2011 |
| KR | 1020130005175 A | 1/2013 |

(Continued)

OTHER PUBLICATIONS

Tyan et al., "Design, fabrication, and characterization of form-birefringent multilayer polarizing beam splitter", J. Opt. Soc. Am. A, vol. 14, No. 7, Jul. 1997, pp. 1627-1636.

*Primary Examiner* — Michael H Caley
*Assistant Examiner* — Jonathan Y Jung
(74) *Attorney, Agent, or Firm* — Cantor Colburn LLP

(57) ABSTRACT

A display device includes a display panel including a first display substrate and a backlight unit. The first display substrate includes a base substrate in which a groove is recessed from a first surface thereof, a light converting layer in the groove, and a protection layer overlapping the light converting layer in the groove and the first surface of the base substrate.

15 Claims, 6 Drawing Sheets

(56) References Cited

U.S. PATENT DOCUMENTS

| | | | | |
|---|---|---|---|---|
| 2014/0043566 A1* | 2/2014 | Lee | .................. | G02F 1/133617 |
| | | | | 349/71 |
| 2014/0204319 A1* | 7/2014 | Cai | .................. | G02F 1/133514 |
| | | | | 349/106 |
| 2015/0009453 A1* | 1/2015 | Cha | ..................... | G02B 6/0001 |
| | | | | 349/65 |
| 2015/0109560 A1* | 4/2015 | Guo | ................. | G02F 1/133617 |
| | | | | 349/68 |
| 2015/0219965 A1* | 8/2015 | Dong | ............... | G02F 1/133617 |
| | | | | 349/69 |
| 2017/0003548 A1* | 1/2017 | Mizunuma | ........ | G02F 1/133617 |

FOREIGN PATENT DOCUMENTS

| | | |
|---|---|---|
| KR | 101326938 B1 | 11/2013 |
| KR | 1020150025651 A | 3/2015 |

* cited by examiner

DISPLAY PANEL WITH LIGHT CONVERTING LAYER THEREIN, DISPLAY DEVICE INCLUDING THE SAME AND METHOD OF MANUFACTURING THE SAME

This application claims priority to Korean Patent Application No. 10-2015-0102658, filed on Jul. 20, 2015, and all the benefits accruing therefrom under 35 U.S.C. § 119, the content of which in its entirety is herein incorporated by reference.

BACKGROUND

1. Field

The invention relates to a display device and a method of manufacturing the display device.

2. Description of the Related Art

Various kinds of thin type display devices, such as a liquid crystal display, an electrowetting display, an electrophoretic display, etc., have been widely used. Each of these display devices includes a light-receiving type display panel and a backlight unit providing a light to the display panel. In general, the backlight unit provides a white light to the display panel, and the white light is converted into a light having a predetermined color after passing through color filters disposed inside the display panel. Then, the colored light is perceived by a user.

SUMMARY

One or more exemplary embodiment of the invention provides a display device having relatively high light efficiency and relatively high color reproducibility.

One or more exemplary embodiment of the invention provides a method of manufacturing the display device.

Exemplary embodiments of the invention provide a display device including a display panel and a backlight unit. The display panel includes a first display substrate and a second display substrate which faces the first display substrate. The backlight unit may provide a light to the display panel.

The first display substrate includes a base substrate in which a groove is recessed from a first surface thereof, a light converting layer in the groove, and a protection layer on the light converting layer in the groove and on the first surface of the base substrate.

The display panel may include a display area at which an image is displayed and a non-display area except for the display area and at which an image is not displayed, and the groove may be overlapped with the display area.

The light converting layer includes at least one of a quantum dot and a quantum rod.

The first display substrate may further include a light shielding layer disposed on the first surface of the base substrate and overlapped with the non-display area. The light shielding layer may be between the base substrate and the protection layer. The first display substrate may further include a polarizing plate on a second surface of the base substrate opposite to the first surface thereof. The first display substrate may further include a display element layer and a color filter layer, and the polarizing plate may be between the base substrate and the display element layer and between the base substrate and the color filter layer. The display panel may further include a liquid crystal layer interposed between the first display substrate and the second display substrate.

The protection layer may include at least one of glass, polyethylene terephthalate and polymethylmethacrylate.

The protection layer may have a film shape of a single-layer structure. The protection layer may include a plurality of layers and each of the layers may include at least one of an inorganic layer and an organic layer.

The light emitted from the backlight unit may be an ultraviolet ray or a blue light.

According to exemplary embodiments, the first display substrate may further include a light shielding layer disposed on a first surface of the protection layer and overlapped with the non-display area. The protection layer may be between the base substrate and the light shielding layer.

According to exemplary embodiments, the first display substrate may further include a polarizing plate disposed in the groove in which the light converting layer is disposed. The light converting layer may be between the polarizing plate and the protection layer.

Exemplary embodiments of the invention provide a manufacturing method of the display device, including forming a first display substrate of a display panel of the display device, and forming the display panel of the display device to include the first display substrate.

The forming the first display substrate includes preparing a master base substrate including a plurality of display cell areas each including a display area and a non-display area, etching a first surface of the master base substrate overlapped with each of the display areas to form grooves recessed from the first surface of the master base substrate at each of the display areas, coating a light converting material into each of the grooves defined in the master base substrate, forming a protection layer on the light converting material in each of the grooves and on the first surface of the master base substrate, and separating the display cell areas from each other, to form the first display substrate of the display panel of the display device.

The forming the first display substrate further may include forming a light shielding layer on the first surface of the master base substrate to overlap the non-display areas.

The forming the light shielding layer includes coating at least one of aluminum and copper or sputtering at least one of aluminum and copper.

The forming the protection layer includes depositing an organic layer or an inorganic layer.

The light converting material includes at least one of a quantum dot and a quantum rod.

According to the above, the light converting layer of the display device is not exposed to outside the first display substrate and is protected, and thus the display quality of the display device is improved.

BRIEF DESCRIPTION OF THE DRAWINGS

The above and other advantages of the present disclosure will become readily apparent by reference to the following detailed description when considered in conjunction with the accompanying drawings where.

DETAILED DESCRIPTION

Figure 1:
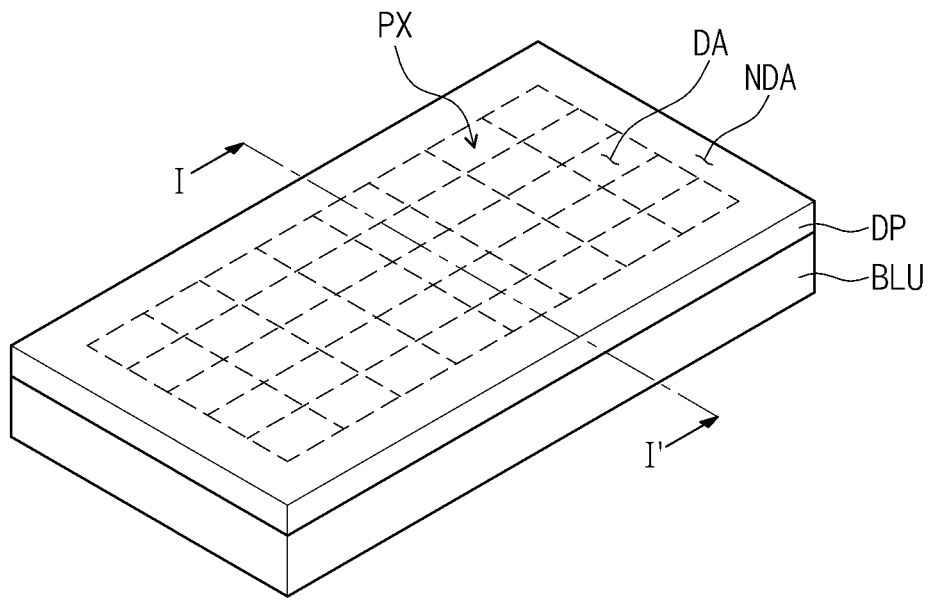
FIG. 1 is a perspective view showing an exemplary embodiment of a display device according to the invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present disclosure.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the disclosure. As used herein, the singular forms, "a", "an" and "the" are intended to include the plural forms as well, unless the context clearly indicates otherwise. As used herein, the term "and/or" includes any and all combinations of one or more of the associated listed items. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, the invention will be explained in detail with reference to the accompanying drawings.

FIG. 1 is a perspective view showing an exemplary embodiment of a display device according to the invention.

Referring to FIG. 1, the display device includes a display surface, which is divided into a plurality of areas. The display surface of the display device includes a display area DA and a non-display area NDA, which are divided depending on whether an image is displayed thereon or not. The display area DA displays the image and includes a plurality of pixels PX disposed therein. The non-display area NDA is disposed adjacent to the display area DA and no image is displayed in the non-display area NDA. The display area DA and the non-display area NDA may define an entirety of the display surface of the display device. As an example, the display area DA may have a substantially rectangular shape. The non-display area NDA surrounds the display area DA in a top plan view of the display device.

The display device includes a display panel DP and a backlight unit BLU.

The display panel DP generates the image corresponding to image data input thereto. The display panel DP may be, but not limited to, a liquid crystal display panel, an electrophoretic display panel, an electrowetting display panel or a microelectromechanical system display panel. In the exemplary embodiment, for the convenience of explanation, the liquid crystal display panel will be described as the display panel DP.

The backlight unit BLU is disposed under the display panel DP to provide a light to the display panel DP. The backlight unit BLU includes a light source (not shown) generating and emitting the light. In the exemplary embodiment, the light source generates a blue light having a wavelength within a range from about 430 nanometers (nm)

to about 470 nm and/or an ultraviolet ray having a wavelength within a range from about 300 nm to about 400 nm.

Figure 2:
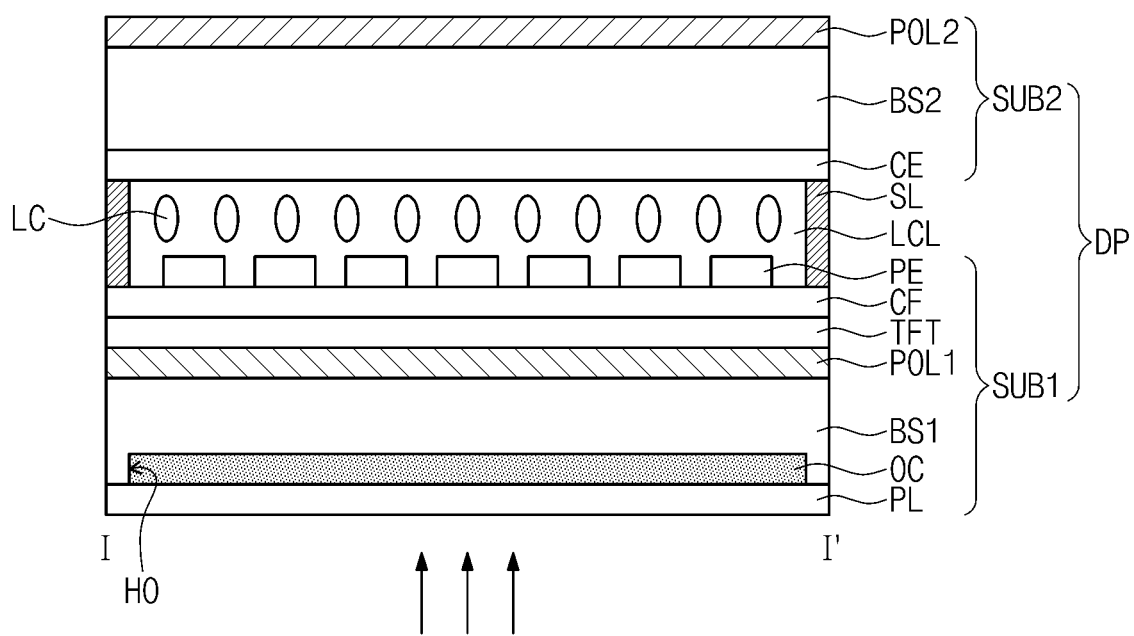
FIG. 2 is a cross-sectional view of the display device taken along line I-I' of FIG. 1.

FIG. 2 is a cross-sectional view of the display device taken along line I-I' of FIG. 1. FIG. 2 shows an enlarged cross-sectional view of the display panel DP shown in FIG. 1.

Referring to FIGS. 1 and 2, the display panel DP includes a first display substrate SUB1, a second display substrate SUB2 facing the first display substrate SUB1, and a liquid crystal layer LCL interposed between the first display substrate SUB1 and the second display substrate SUB2.

The first display substrate SUB1 includes a first base substrate BS1 on which a light converting layer OC, a protection layer PL, a first polarizing plate POL1, a display element layer TFT, a color filter layer CF, and a pixel electrode PE are provided. The pixel electrode PE may be provided in plural.

The first base substrate BS1 is provided with a groove HO such as formed by etching a portion of a first (lower) surface of the first base substrate BS1. Portions of the first base substrate BS1 may define the groove HO recessed from the first surface of the first base substrate SUB1. The groove HO may overlap with the display area DA. The groove HO may have a same planar area as that of the display area DA or the groove HO may have a planar area greater than that of the display area DA. A maximum depth of the groove HO may be smaller than a total thickness of the first base substrate BS1. The depth of the groove HO and the thickness of the first base substrate BS1 are defined in a thickness direction of the display device.

The light converting layer OC is disposed in the groove HO. In the exemplary embodiment, the depth of the groove HO may depend on a concentration of materials included in the light converting layer OC. In an exemplary embodiment, for instance, where the concentration of the materials included in the light converting layer OC is relatively high, the depth of the groove HO is relatively shallow, and where the concentration of the materials included in the light converting layer OC is relatively low, the depth of the groove HO is relatively deep.

The light converting layer OC may absorb the light generated by the light source and provided from the backlight unit BLU (refer to upward arrows in FIG. 2) and emit a light having a wavelength longer than that of the light provided from the backlight unit BLU. In an exemplary embodiment, for instance, where the light provided from the backlight unit BLU is a blue light, the light converting layer OC may convert a portion of the blue light to a green light and a red light. In addition, when the light provided from the backlight unit BLU is an ultraviolet ray, the light converting layer OC may convert one portion of the ultraviolet ray to the blue light, another portion of the ultraviolet ray to the green light, and still another portion of the ultraviolet ray to the red light.

The light converting layer OC may include at least one of a quantum dot having a spherical shape and a quantum rod having a rod shape, but should not be limited thereto or thereby. That is, the light converting layer OC may include various materials, such as a fluorescent substance as long as the material of the light converting layer OC are capable of converting the wavelength of the light from the backlight unit BLU.

The protection layer PL is disposed on the light converting layer OC and a portion of the first surface of the first base substrate BS1 exposed by the light converting layer OC. The protection layer PL may reduce or effectively prevent foreign substances from entering into the light converting layer OC. The protection layer PL may form an outermost layer of the display panel DP.

The protection layer PL may include at least one of glass, polyethylene terephthalate, and polymethylmethacrylate ("PMMA").

The protection layer PL may include a plurality of layers therein, and each of the layers may include at least one of an inorganic layer and an organic layer.

The first polarizing plate POL1 is disposed on a second (upper) surface of the first base substrate BS1 opposite to the first surface of the first base substrate BS1. The first polarizing plate POL1 linearly polarizes the light exiting from the light converting layer OC. The first polarizing plate POL1 has a first transmission axis. In the exemplary embodiment, the first polarizing plate POL1 may include a metal material. The first polarizing plate POL1 may be a wire grid polarizer.

The display element layer TFT is disposed on the first polarizing plate POL1. A plurality of signal lines (not shown) is disposed in the display element layer TFT. The signal lines may include a gate line, a data line crossing the gate line and a thin film transistor which cooperate to drive the pixels PX as display elements of the display device.

The color filter layer CF is disposed on the display element layer TFT. Although not shown in figures, a black matrix (not shown) may further be disposed around the color filter layer CF in the top plan view to block the light.

The color filter layer CF may be defined by at least one of a red color filter through which only the red light passes, a green color filter through which only the green light passes, and a blue color filter through which only the blue light passes. The color filters may be provided in plural within the color filter layer CF and each color filter of the color filter layer CF is disposed in a corresponding pixel PX among the plural pixels PX of the display device.

In the exemplary embodiment, the color filter layer CF is disposed in the first display substrate SUB1, however, should not be limited thereto or thereby. The color filter layer CF may be disposed in the second display substrate SUB2.

The pixel electrode PE is disposed on the color filter layer CF. The pixel electrode PE is connected to the element layer TFT to receive a driving signal therefrom.

The second display substrate SUB2 includes a second base substrate BS2, a common electrode CE and a second polarizing plate POL2.

The second base substrate BS2 is disposed to face the first base substrate BS1 and the liquid crystal layer LCL is interposed between the first base substrate BS1 and the second base substrate BS2.

The common electrode CE may be provided on a first (lower) surface of the second base substrate BS2 as a transparent electrode. The common electrode CE applies a voltage to the liquid crystal layer LCL to form an electric field in cooperation with the pixel electrode PE. In the exemplary embodiment, the common electrode CE is disposed in the second display substrate SUB2, however, should not be limited thereto or thereby. The common electrode CE may be disposed in the first display substrate SUB1 and form the electric field in cooperation with the pixel electrode PE in the first display substrate SUB1.

The second polarizing plate POL2 is disposed on a second (upper) surface of the second base substrate BS2 opposite to the first surface of the second base substrate BS2. The second polarizing plate POL2 has a second transmission axis substantially perpendicular to the first transmission axis of the first polarizing plate POL1, but should not be limited thereto or thereby. That is, the second transmission axis may be substantially parallel to the first transmission axis. In the exemplary embodiment, the second polarizing plate POL2 may be provided in a film type form.

The liquid crystal layer LCL is disposed between the first display substrate SUB1 and the second display substrate SUB2. The liquid crystal layer LCL includes a plurality of liquid crystal molecules LC. Exposure of the liquid crystal molecules LC to outside the display device is reduced or effectively prevented by a sealing portion SL disposed in the non-display area NDA. The sealing portion SL couples the first and second display substrates SUB1 and SUB2 to each other and disposes the liquid crystal layer LCL therebetween.

According to one or more exemplary embodiment of the display device, the light converting layer OC is disposed in the groove HO defined in the first base substrate BS1 and the protection layer PL is provided to cover the light converting layer OC disposed in the groove HO. Thus, entry of the foreign substance into the light converting layer OC disposed in the groove HO is reduced or effectively prevented. Also, deterioration of the light converting layer OC disposed in the groove HO is reduced or effectively prevented due to the protection layer PL. Consequently, the reliability of the light converting layer OC is improved and the display quality of the display device is improved.

Hereinafter, other exemplary embodiments of the present disclosure will be described with reference to accompanying drawings. For the convenience of explanation, different features from those of the above-mentioned exemplary embodiment will be mainly described. In addition, the same reference numerals denote the same elements in the above-mentioned exemplary embodiment, and thus detailed descriptions of the same elements will be omitted.

Each of FIGS. 3 to 6 is an enlarged cross-sectional view showing another exemplary embodiment of a display panel of a display device according to the invention.

Figure 3:
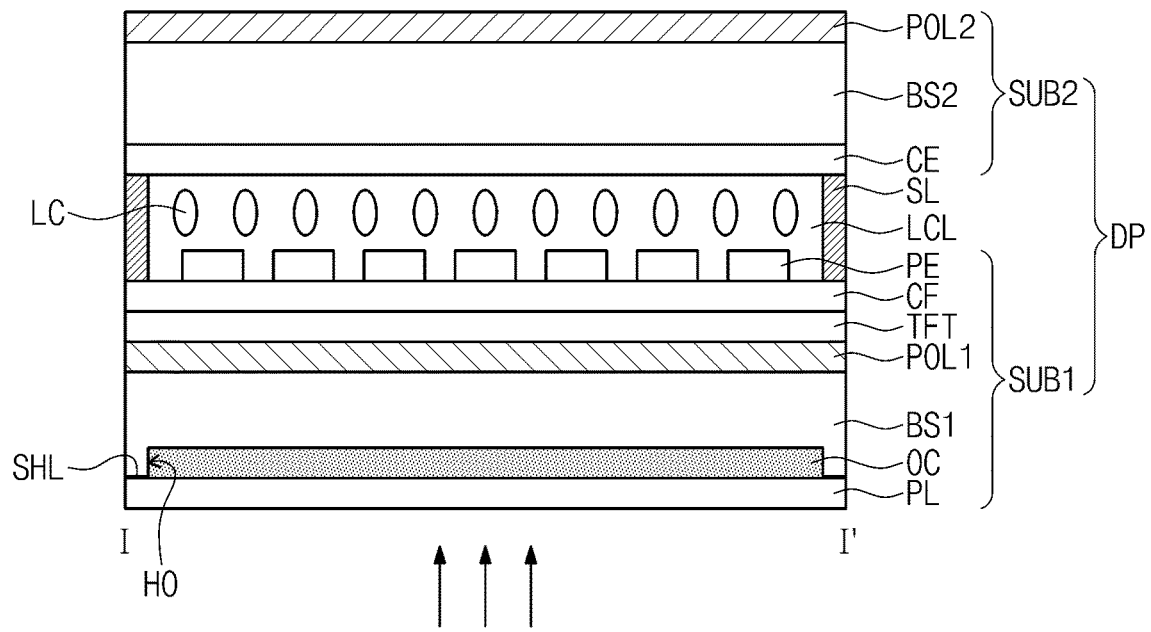
FIG. 3 is a cross-sectional view showing another exemplary embodiment of a display device according to the invention.
Figure 4:
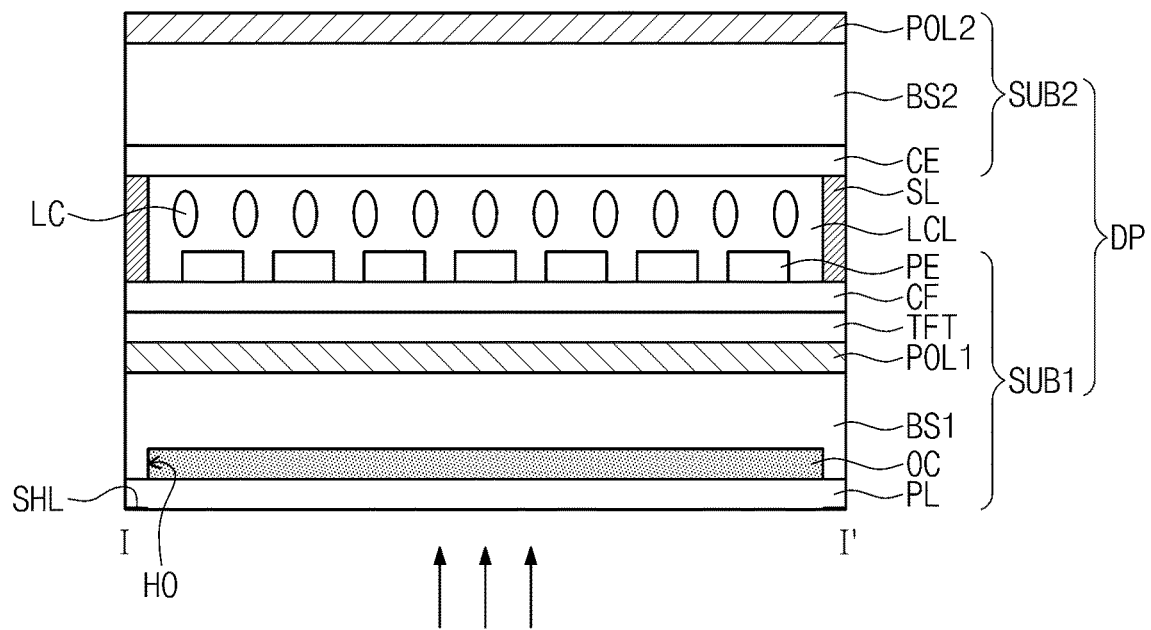
FIG. 4 is a cross-sectional view showing still another exemplary embodiment of a display device according to the invention.

The display panel DP shown in FIGS. 3 and 4 may further include a light shielding layer SHL disposed in the first display substrate SUB1 when compared with the display panel DP shown in FIG. 2.

Referring to FIG. 3, the light shielding layer SHL is disposed on the first (lower) surface of the first base substrate BS1 at a portion of the first surface which is overlapped with the non-display area NDA. The light shielding layer SHL surrounds the light converting layer OC in the top plan view and is disposed between the first base substrate BS1 and the protection layer PL. The light shielding layer SHL may include a metal material, such as aluminum or copper. The light shielding layer SHL reflects the light emitted from the backlight unit BLU and traveling to the outside of the first base substrate BS1 without passing through the light converting layer OC. Thus, the light shielding layer SHL may reduce or effectively prevent the light from leaking to the outside of the display panel DP.

Referring to FIG. 4, the light shielding layer SHL is disposed on a first (lower) surface of the protection layer PL which faces the backlight unit BLU, and is overlapped with the non-display area NDA. The light shielding layer SHL reflects the light emitted from the backlight unit BLU and traveling to the outside of the first base substrate BS1 without passing through the light converting layer OC. Thus, the light shielding layer SHL may reduce or effectively prevent the light from leaking to the outside of the display panel DP.

Figure 5:
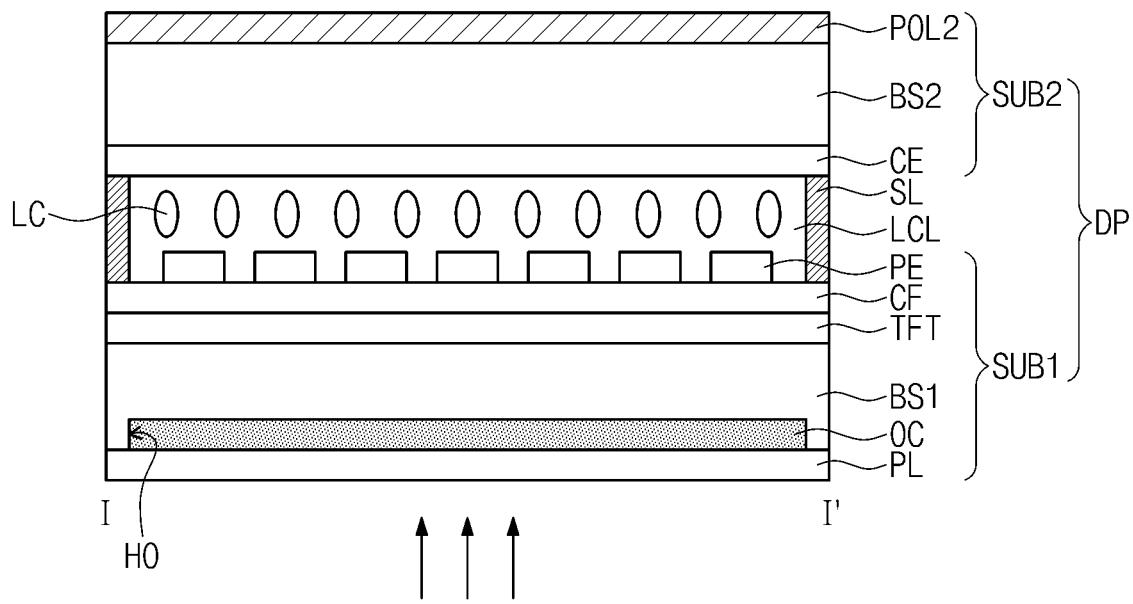
FIG. 5 is a cross-sectional view showing yet another exemplary embodiment of a display device according to the invention.

When compared with the display panel DP shown in FIG. 2, the first polarizing plate POL1 included in the display panel DP shown in FIG. 2 may be omitted in a display panel DP shown in FIG. 5. Since the light converting layer OC includes the quantum rod, the light converting layer OC may function to linearly polarize the light incident thereto. Therefore, the first polarizing plate POL1 may be omitted, and thus a total thickness of the display panel DP may be reduced.

Figure 6:
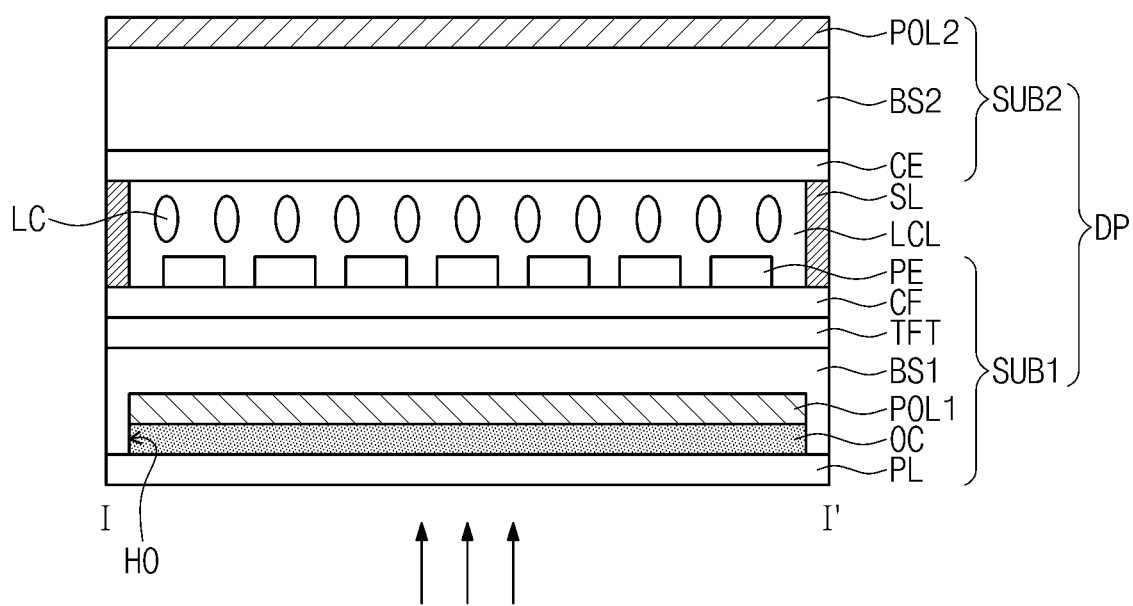
FIG. 6 is a cross-sectional view showing yet another exemplary embodiment of a display device according to the invention.

The display panel DP shown in FIG. 6 has the same structure and function as those of the display panel DP shown in FIG. 2 except for a position of a first polarizing plate POL1 in the display panel DP shown in FIG. 6.

In FIG. 6, the first polarizing plate POL1 and the light converting layer OC are each disposed in the groove HO defined in the first base substrate BS1. The first polarizing plate POL1 opposes the protection layer PL with the light converting layer OC therebetween. Thus, the light emitted from the light converting layer OC travels upward from the light converting layer OC after passing through the first polarizing plate POL1.

Hereinafter, an exemplary embodiment of a manufacturing method of the display device according to the invention will be described. In FIGS. 7A to 7E, the same reference numerals denote the same elements in the previous exemplary embodiments, and thus detailed descriptions of the same elements will be omitted.

An exemplary embodiment of a method of manufacturing the display device according to the invention includes forming the first display substrate and forming the display panel using the first display substrate.

FIGS. 7A to 7E are perspective views sequentially showing an exemplary embodiment of a method of manufacturing a display device according to the invention. Hereinafter, the forming the first display substrate will be described in detail with reference to with reference to FIGS. 7A to 7E.

Figure 7A:
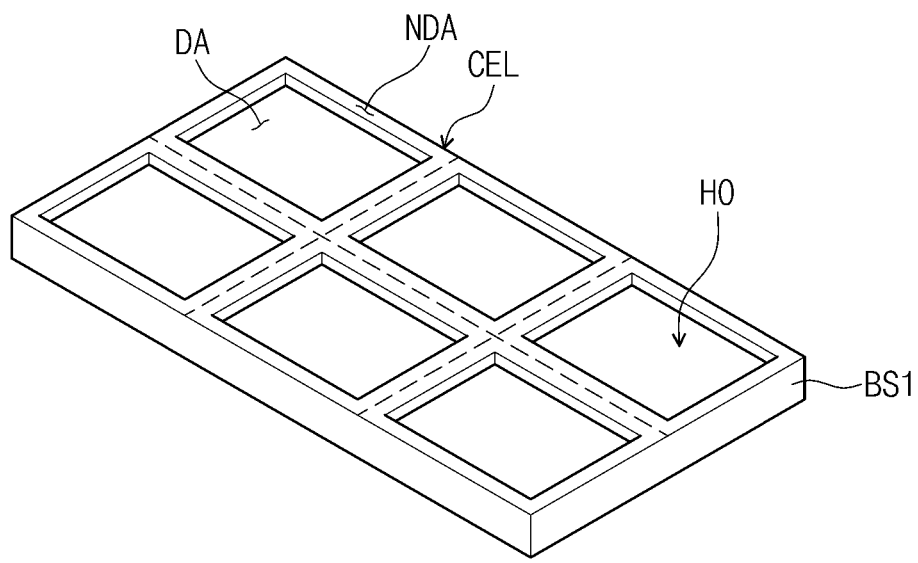
FIGS. 7A to 7E are perspective views showing an exemplary embodiment of a method of manufacturing a display device according to the invention.

The forming of the first display substrate includes preparing a master first base substrate including a plurality of display cell areas, etching a first surface of the master first base substrate to form grooves therein, coating a light converting material into each of the grooves, forming a protection layer, and separating the display cell areas of the master first base substrate from each other. Also, the forming the first display substrate may further include forming a light shielding layer on the first surface of the first base substrate. FIG. 7A shows the forming of the grooves in a master first base substrate including the display cell areas. For convenience of description, FIGS. 7A to 7E indicate the master first base substrate including the display cell area provided in plural and an individual first base substrate of an individual display cell as BS1.

As shown in FIG. 7A, the master first base substrate BS1 includes the plurality of display cell areas CEL (indicated by dotted lines). Each of the display cell areas CEL includes defined therefor a display area DA and a non-display area NDA which surrounds the display area DA. Each of the display cell areas CEL may include an individual first base substrate BS1 forming one individual display panel.

The grooves HO are respectively formed in the display cell areas CEL such as by etching the first surface of the master first base substrate BS1 at areas thereof overlapped with each of the display areas DA.

Figure 7B:
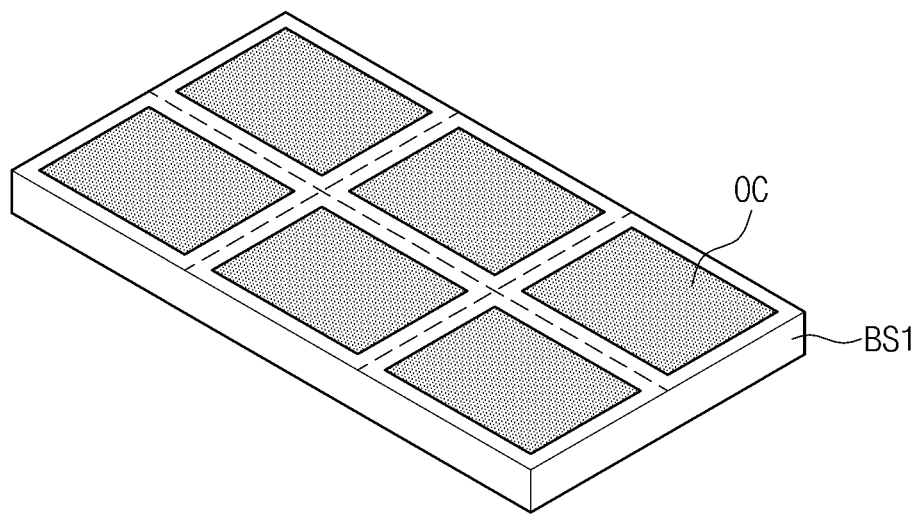

FIG. 7B shows the coating of a light converting material.

As shown in FIG. 7B, the light converting material is coated into each of the grooves HO formed recessed from the first surface of the master first base substrate BS1. The light converting material may include at least one of a quantum dot and a quantum rod. The light converting material is coated onto each of the grooves HO to respectively form the light converting layer OC of the display cell areas CEL.

Figure 7C:
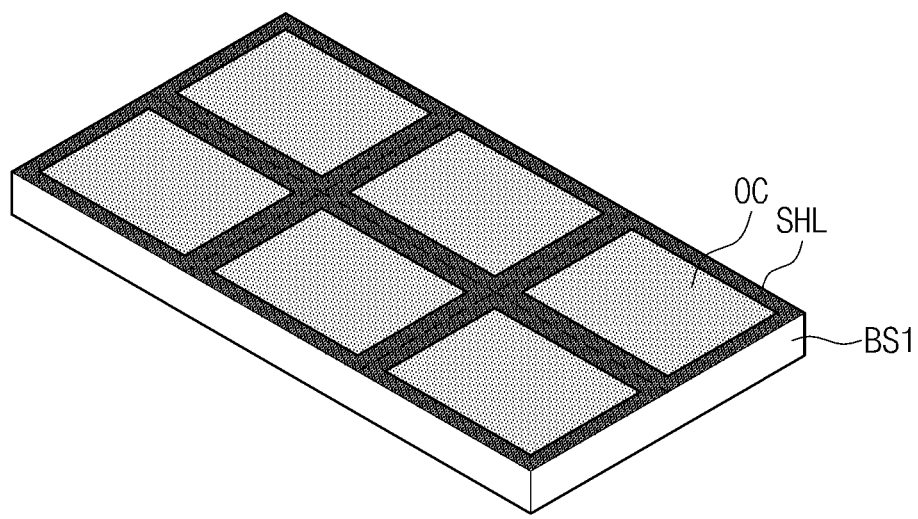

FIG. 7C shows the forming of the light shielding layer.

The forming of the light shielding layer includes coating at least one of aluminum and copper or sputtering at least one of aluminum and copper onto the structure of FIG. 7B. The light shielding layer SHL is formed on the first surface of the first base substrate BS1 overlapped with the non-display area NDA. Referring to FIG. 3, for example, the light shielding layer SHL is on the first surface of the first base substrate BS1 of an individual display panel DP.

However, the forming of the light shielding layer SHL should not be limited thereto or thereby. According to another exemplary embodiment of the present disclosure, the light shielding layer SHL may be formed on the first base substrate BS1 after a protection layer is formed thereon. Referring to FIG. 4, for example, the light shielding layer SHL is on the first surface of the protection layer PL of an individual display panel DP.

Figure 7D:
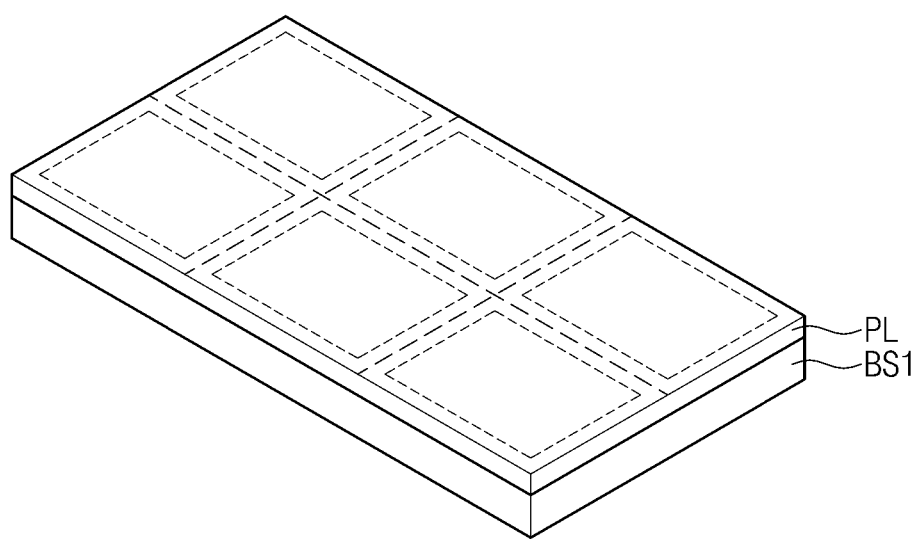

FIG. 7D shows the forming of the protection layer.

As shown in FIG. 7D, the protection layer PL is formed on the light converting material OC disposed in the grooves HO overlapped with the display area DA and the first surface of the master first base substrate BS1 overlapped with the non-display area NDA. In the exemplary embodiment, the protection layer PL may be provided in a film shape having a single-layer structure.

However, the forming of the protection layer PL should not be limited thereto or thereby. According to another exemplary embodiment of the present disclosure, the forming of the protection layer PL may further include depositing an organic layer or inorganic layer for sealing the light converting material. Thus, the protection layer PL may have a multi-layer structure of the organic layer and/or the inorganic layer.

Figure 7E:
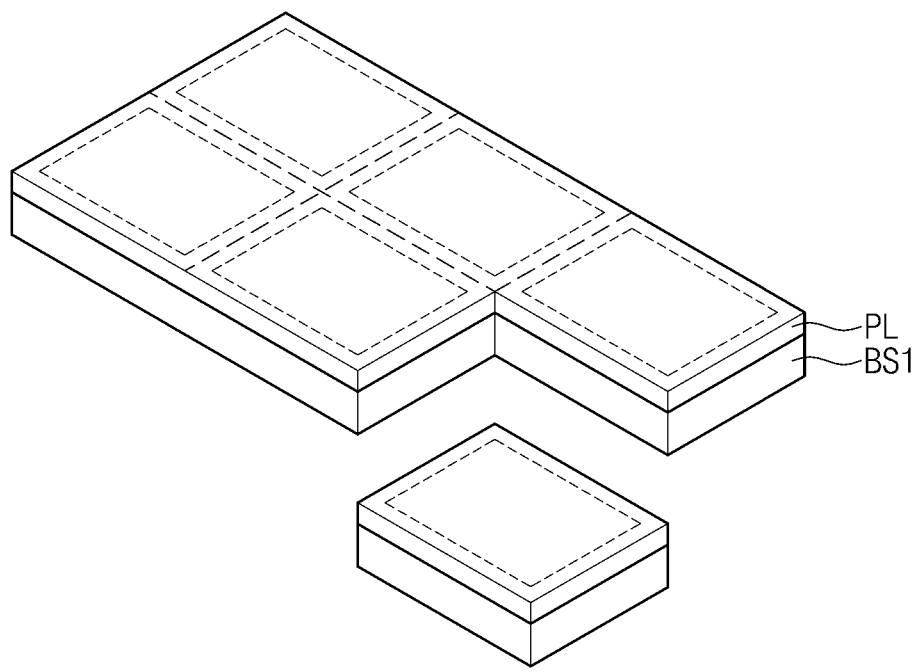

FIG. 7E shows the separating of the display cell areas from the master first base substrate BS1.

As shown in FIG. 7E, the display cell areas CEL are separated from each other such as through a scribing process. Each display cell area may be included in or form one individual display panel including individual ones of the above-described layers.

Although not shown in figures, the forming of the display panel using the first display substrate may further include forming a second display substrate, coupling the first and the second display substrates to each other, and injecting the liquid crystal molecules between the first display substrate and the second display substrate.

In one or more exemplary embodiment of the manufacturing method of the display device according to the invention, since the light converting layer OC is surrounded and effectively encapsulated by portions of the first base substrate BS1 and the protection layer PL, entry of a foreign substance into the light converting layer OC is reduced or effectively prevented. Also, in one or more exemplary embodiment, a maximum thickness of the display device may be reduced as compared with a conventional display device in which a light converting layer is disposed outside the display panel such as on the backlight unit or on the display panel.

Although exemplary embodiments of the present disclosure have been described, it is understood that the present disclosure should not be limited to these exemplary embodiments but various changes and modifications can be made by one ordinary skilled in the art within the spirit and scope of the present disclosure as hereinafter claimed.

What is claimed is:

1. A display device comprising:
   a display panel which displays an image with light, the display panel comprising a first display substrate and a second display substrate which faces the first display substrate; and
   a backlight unit which generates and provides the light to the display panel,
   wherein the first display substrate comprises:
      a base substrate comprising a single layer in which a groove is recessed from a first surface of the single layer of the base substrate;
      a display element layer comprising a thin film transistor;
      a light converting layer in the groove recessed in the single layer of the base substrate; and
      a protection layer disposed between the light converting layer in the groove and the backlight unit, the protection layer overlapping the light converting layer in the groove and the first surface of the single layer of the base substrate,
   wherein
   each of the light converting layer and the single layer of the base substrate is between the display element layer comprising the thin film transistor and the protection layer, and
   an inner surface of the single layer of the base substrate which defines the groove thereof and the protection layer cover an entirety of the light converting layer in the groove.

2. The display device of claim 1, wherein
   the display panel further comprises a display area at which the image is displayed and a non-display area except for the display area and at which the image is not displayed,
   the inner surface of the single layer of the base substrate defines sides of the base substrate which define the groove, and
   the sides of the base substrate which define the groove correspond to outer edges of the display area.

3. The display device of claim 2, wherein the light converting layer comprises at least one of a quantum dot and a quantum rod.

4. The display device of claim 3, wherein the first display substrate further comprises a light shielding layer disposed on the first surface of the base substrate and overlapped with the non-display area, the light shielding layer between the base substrate and the protection layer.

5. The display device of claim 3, wherein the first display substrate further comprises a light shielding layer disposed on a first surface of the protection layer to dispose the protection layer between the base substrate and the light shielding layer.

6. The display device of claim 3, wherein the first display substrate further comprises a polarizing plate on a second surface of the base substrate opposite to the first surface thereof.

7. The display device of claim 6, wherein
   the first display substrate further comprises a color filter layer, the display element layer comprising the thin film transistor being disposed between color filter layer and the single layer of the base substrate, and
   the polarizing plate is disposed between the base substrate and the display element layer comprising the thin film transistor and between the base substrate and the color filter layer.

8. The display device of claim 7, wherein the display panel further comprises a liquid crystal layer interposed between the first display substrate and the second display substrate.

9. The display device of claim 3, wherein
the first display substrate further comprises a polarizing plate in the groove in which the light converting layer is disposed, and
the light converting layer is between the polarizing plate and the protection layer.

10. The display device of claim 1, wherein the protection layer comprises at least one of glass, polyethylene terephthalate and polymethylmethacrylate.

11. The display device of claim 10, wherein the protection layer has a film shape of a single-layer structure.

12. The display device of claim 10, wherein the protection layer comprises a plurality of layers each of which comprises at least one of an inorganic layer and an organic layer.

13. The display device of claim 1, wherein the light is an ultraviolet ray or a blue light.

14. A display device comprising:
a display panel which displays an image with light, the display panel comprising a first display substrate and a second display substrate which faces the first display substrate; and
a backlight unit which generates and provides the light to the display panel,
wherein the first display substrate comprises:
a base substrate in which a groove is recessed from a first surface of the base substrate;
a display element layer comprising a thin film transistor, on the base substrate;
a light converting layer in the groove recessed in the base substrate; and
a protection layer disposed between the light converting layer in the groove and the backlight unit, the protection layer overlapping the light converting layer in the groove and the first surface of the base substrate to surround the light converting layer together with the base substrate and encapsulate the light converting layer in the groove,
wherein
each of the light converting layer and the base substrate are between the display element layer comprising the thin film transistor and the protection layer, and
a portion of the protection layer which is closest to the display element layer comprising the thin film transistor along a thickness of the display panel is disposed outside of groove of the base substrate.

15. The display device of claim 14, wherein the portion of the protection layer which is closest to the display element layer comprising the thin film transistor and disposed outside of groove of the base substrate is a portion of an outermost layer of the display panel.

* * * * *